US010158660B1

(12) United States Patent
Reguly et al.

(10) Patent No.: US 10,158,660 B1
(45) Date of Patent: Dec. 18, 2018

(54) DYNAMIC VULNERABILITY CORRELATION

(71) Applicant: Tripwire, Inc., Portland, OR (US)

(72) Inventors: Tyler Reguly, Toronto (CA); Chris Pawlukowsky, Alpharetta, GA (US); Matthew Jonathan Condren, Cumming, GA (US)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 14/165,410

(22) Filed: Jan. 27, 2014

Related U.S. Application Data

(60) Provisional application No. 61/922,679, filed on Dec. 31, 2013, provisional application No. 61/892,318, filed on Oct. 17, 2013.

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,957,348 B1 | 10/2005 | Flowers et al. | |
| 7,073,198 B1 | 7/2006 | Flowers et al. | |
| 7,146,642 B1 * | 12/2006 | Magdych | H04L 63/1433 726/22 |
| 7,162,742 B1 | 1/2007 | Flowers et al. | |
| 7,181,769 B1 | 2/2007 | Keanini et al. | |
| 7,243,348 B2 | 7/2007 | Good et al. | |
| 7,316,016 B2 | 1/2008 | DiFalco | |
| 7,360,099 B2 | 4/2008 | DiFalco et al. | |
| 7,509,681 B2 | 3/2009 | Flowers et al. | |
| 7,587,754 B2 | 9/2009 | DiFalco et al. | |
| 7,594,273 B2 | 9/2009 | Keanini et al. | |
| 7,620,715 B2 | 11/2009 | DiFalco et al. | |

(Continued)

OTHER PUBLICATIONS

U.S. Appl. No. 14/546,863, Pawlukowsky et al.
(Continued)

*Primary Examiner* — David Le
(74) *Attorney, Agent, or Firm* — Klarquist Sparkman, LLP

(57) ABSTRACT

Apparatus and methods are disclosed for performing dynamic vulnerability correlation suitable for use in enterprise information technology (IT) environments, including vulnerability filtering, patch correlation, and vulnerability paring. According to one disclosed embodiment, a method of vulnerability filtering includes attempting to execute vulnerability scanning rules according to a specified order in a rule hierarchy, and depending on the type of the rule hierarchy and on whether the attempt was successful, not executing additional rules in the rule hierarchy. In another disclosed embodiment, a method of patch correlation includes executing vulnerability scanning rules based on a correlation associations including, if a particular vulnerability is detected, then not executing other correlated scanning rules for a particular software patch. In another disclosed embodiment, a method of vulnerability paring includes defining a plurality of patch milestones for a software product and scanning a target computer for vulnerabilities associated with a current installed patch.

26 Claims, 14 Drawing Sheets

(56) References Cited

U.S. PATENT DOCUMENTS

| | | | |
|---|---|---|---|
| 7,765,460 | B2 | 7/2010 | DiFalco et al. |
| 7,822,724 | B2 | 10/2010 | DiFalco et al. |
| 8,020,211 | B2 | 9/2011 | Keanini et al. |
| 8,140,635 | B2 | 3/2012 | DiFalco |
| 8,176,158 | B2 | 5/2012 | DiFalco et al. |
| 8,176,544 | B2 | 5/2012 | Keanini et al. |
| 8,230,071 | B1 | 7/2012 | Quilter et al. |
| 8,356,089 | B1 | 1/2013 | Quilter et al. |
| 8,615,572 | B1 | 12/2013 | Quilter et al. |
| 2002/0091745 | A1* | 7/2002 | Ramamurthy et al. ....... 709/100 |
| 2002/0196330 | A1 | 12/2002 | Park et al. |
| 2002/0198981 | A1* | 12/2002 | Corl et al. .................... 709/224 |
| 2004/0024843 | A1 | 2/2004 | Smith |
| 2004/0075738 | A1 | 4/2004 | Burke et al. |
| 2004/0122962 | A1 | 6/2004 | DiFalco et al. |
| 2005/0187963 | A1* | 8/2005 | Markin ................ G06F 21/577 |
| 2006/0206883 | A1 | 9/2006 | Sabbouh |
| 2006/0242277 | A1 | 10/2006 | Torrence et al. |
| 2007/0043786 | A1 | 2/2007 | DiFalco et al. |
| 2007/0124255 | A1 | 5/2007 | DiFalco et al. |
| 2007/0239862 | A1 | 10/2007 | Bronez et al. |
| 2008/0016501 | A1 | 1/2008 | Muhlestein et al. |
| 2008/0021912 | A1 | 1/2008 | Seligman et al. |
| 2008/0168420 | A1 | 7/2008 | Sabbouh |
| 2010/0005107 | A1 | 1/2010 | DiFalco |
| 2010/0043066 | A1 | 2/2010 | Miliefsky |
| 2010/0107257 | A1* | 4/2010 | Ollmann ........................ 726/24 |
| 2011/0066951 | A1 | 3/2011 | Ward-Karet et al. |
| 2011/0197094 | A1 | 8/2011 | Wagner |
| 2011/0197189 | A1 | 8/2011 | Wagner et al. |
| 2011/0197205 | A1 | 8/2011 | Wagner et al. |
| 2011/0208841 | A1 | 8/2011 | Robertson et al. |
| 2012/0023076 | A1 | 1/2012 | Torrence et al. |
| 2012/0179805 | A1 | 7/2012 | DiFalco |
| 2012/0210434 | A1* | 8/2012 | Curtis et al. .................... 726/25 |

OTHER PUBLICATIONS

ITU-T Recommendation X.667, "Information technology—Open Systems Interconnection—Procedures for the operation of OSI Registration Authorities: Generation and registration of Universally Unique Identifiers (UUIDs) and their use as ASN.1 object identifier components," Sep. 2004, 34 pages.

Lanzy, "Improve IT Security with Credentialed Vulnerability Scans," Minnesota State Colleges and Universities 2011 Information Technology Conference, document not dated, downloaded on Jan. 6, 2015 from http://home.comcast.net/~lanzyg/2011ITconferenceCredentialedScanning.pdf, 70 pages.

"Common Vulnerabilities and Exposures—CVE®," MITRE Corporation, document not dated, downloaded on Jan. 6, 2015, 2 pages.

Martin et al., "A Progress Report on the CVE Initiative," MITRE Corporation, document not dated, downloaded on Jan. 6, 2015, 22 pages.

Tasker et al., "Common Vulnerabilities and Exposures (CVE)," MITRE Corporation, document marked Sep. 29, 1999, downloaded on Jan. 6, 2015, 13 pages.

MITRE Corporation, "Widespread Use of CVE," Dec. 18, 2014, 1 page.

MITRE Corporation, "CWE in the Enterprise," document not dated, downloaded on Jan. 6, 2015, 1 page.

MITRE Corporation, "CWE Version 2.8," Jul. 31, 2014, copyright page, Table of Contents, pp. 1-11, Glossary, and Index, totaling 46 pages.

MITRE Corporation, "Common Weakness Enumeration—CWE™," document not dated, downloaded on Jan. 6, 2015, 2 pages.

* cited by examiner

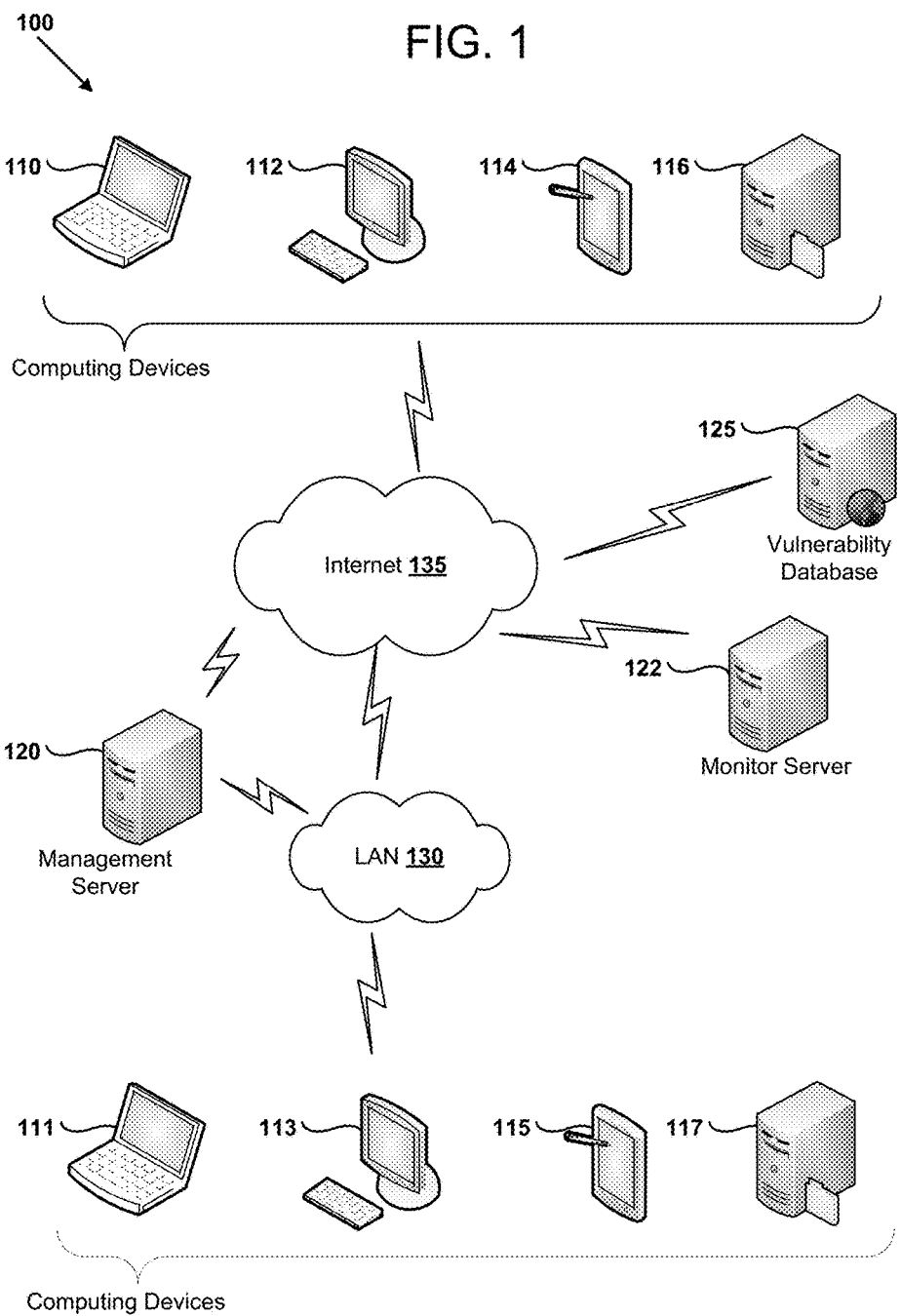

Name: CVE-2012-4558
Description: Multiple cross-site scripting (XSS) vulnerabilities in the balancer_handler function in the manager interface in mod_proxy_balancer.c in the mod_proxy_balancer module in the Apache HTTP Server 2.2.x before 2.2.24-dev and 2.4.x before 2.4.4 allow remote attackers to inject arbitrary web script or HTML via a crafted string.
Status:Assigned
References: CONFIRM:http://httpd.apache.org/security/vulnerabilities_22.html
CONFIRM:http://httpd.apache.org/security/vulnerabilities_24.html
CONFIRM:http://svn.apache.org/viewvc/httpd/httpd/trunk/modules/proxy/
mod_proxy_balancer.c?r1=1404653&r2=1413732&diff_format=h
CONFIRM:http://support.apple.com/kb/HT5880
APPLE:APPLE-SA-2013-09-12-1
URL:http://lists.apple.com/archives/security-announce/2013/Sep/msg00002.html
DEBIAN:DSA-2637
URL:http://www.debian.org/security/2013/dsa-2637
FEDORA:FEDORA-2013-4541
URL:http://lists.fedoraproject.org/pipermail/package-announce/2013-April/101196.html
REDHAT:RHSA-2013:0815
URL:http://rhn.redhat.com/errata/RHSA-2013-0815.html
REDHAT:RHSA-2013:1207
URL:http://rhn.redhat.com/errata/RHSA-2013-1207.html
REDHAT:RHSA-2013:1208
URL:http://rhn.redhat.com/errata/RHSA-2013-1208.html
REDHAT:RHSA-2013:1209
URL:http://rhn.redhat.com/errata/RHSA-2013-1209.html
OVAL:oval:org.mitre.oval:def:18977
URL:http://oval.mitre.org/repository/data/getDef?id=oval:org.mitre.oval:def:18977

CWE-79: Improper Neutralization of Input During Web Page Generation ('Cross-site Scripting')
Description Summary
The software does not neutralize or incorrectly neutralizes user-controllable input before it is placed in output that is used as a web page that is served to other users.

CWE-80: Improper Neutralization of Script-Related HTML Tags in a Web Page (Basic XSS)

Improper Neutralization of Script-Related HTML Tags in a Web Page (Basic XSS)
Weakness ID: 80 (Weakness Variant)          Status: Incomplete
+ Description
Description Summary
The software receives input from an upstream component, but it does not neutralize or incorrectly neutralizes special characters such as "<", ">", and "&" that could be interpreted as web-scripting elements when they are sent to a downstream component that processes web pages.

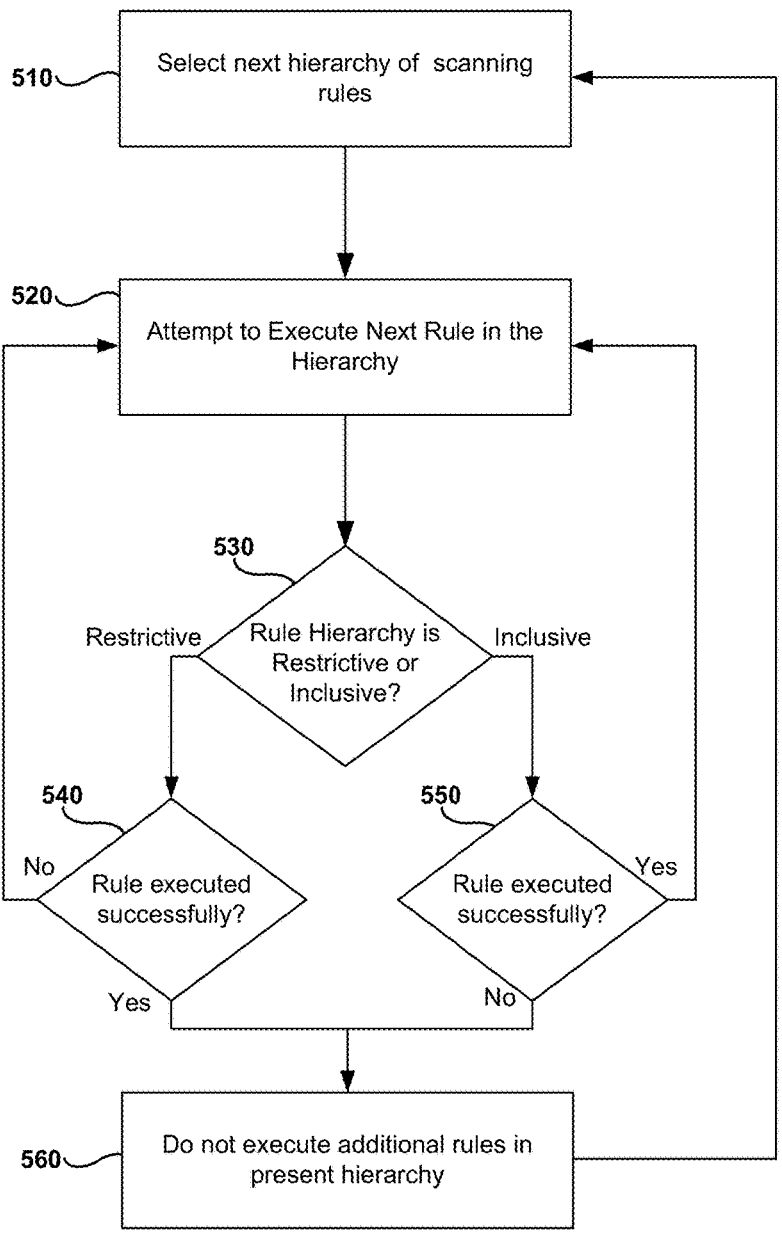

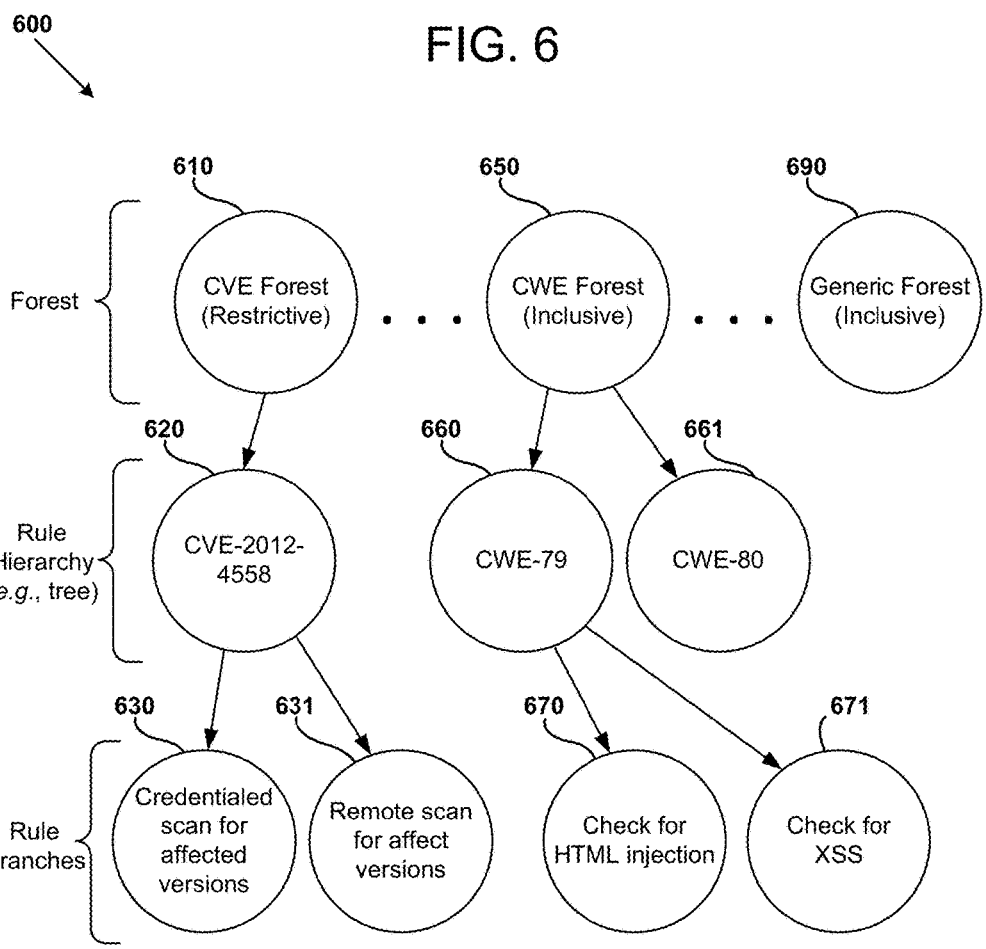

1500

DYNAMIC VULNERABILITY CORRELATION

CROSS-REFERENCE TO RELATED APPLICATIONS

This application claims the benefit of U.S. Provisional Application No. 61/892,318, entitled "Dynamic Vulnerability Correlation," filed Oct. 17, 2013; and U.S. Provisional Application No. 61/922,679, entitled "Dynamic Vulnerability Correlation," filed Dec. 31, 2013, which applications are incorporated by reference herein in their entireties for all purposes.

BACKGROUND

Vulnerability scanning enables enterprises to automatically, continuously detect critical web application vulnerabilities within the context of overall IT risk, thereby enabling security teams to focus resources on the most important risks. Such scanning allows assessment of web application, operating systems, and adjacent applications in production environments. Existing vulnerability scanning solutions can scan for upwards of 60,000 conditions, a number which continues at an ever-increasing rate. The number and rate of vulnerabilities being discovered is also steadily increasing. Corresponding scan times are increasing in turn, resulting in longer scans and development times just to maintain existing coverage speed. Accordingly, ample opportunity exists for improving vulnerability detection and scanning.

SUMMARY

Apparatus and methods are disclosed for improving vulnerability detection and scanning as can be used in networked computing environments. In particular, dynamic vulnerability correlation can be used to improve vulnerability detection and scanning techniques. Techniques associated with dynamic vulnerability correlation that are disclosed herein include: vulnerability filtering, patch correlation, and vulnerability paring, each of which can be used alone or in various combinations with one another.

In some examples of the disclosed technology, a method of vulnerability filtering includes receiving one or more forests of vulnerability rules, each of the forests comprising one or more trees being marked as Restrictive or Inclusive, each of the one or more trees being associated with one or more branches comprising one or more vulnerability scanning rules, and each of the one or more trees being assigned a priority level and a confidence level. The method further includes evaluating the forests of vulnerability rules by traversing each of the trees and executing at least one vulnerability scanning rule associated with at least one of the branches. As the evaluating proceeds and the forests are traversed, if the tree is marked Restrictive and one or more vulnerability scanning rules in an associated branch of the respective tree are executed, then executing vulnerability scanning rules in any subsequent branches of the respective tree are not executed. Conversely, if the tree is marked Inclusive, and one or more vulnerability scanning rules in an associated branch of the respective tree are not executed, then vulnerability scanning rules in any subsequent branches of the respective tree are not executed.

In some examples, the forests include a Common Vulnerabilities and Exposures (CVE) forest, a Common Weakness Enumeration (CWE) forest, and a Generic forest and the priority level determines the order in which branches are executed. In some examples a host agent executes scanning rules (e.g., for vulnerabilities and weaknesses) on a local computing device, while in other examples, a remote computing device is scanned (e.g., using a remote scan or a credentialed scan, such as deep reflex testing) to execute the vulnerability scanning rules. As will be understood to one of ordinary skill in the art, the techniques disclosed herein can be adapted to be used with both agent and agentless techniques for vulnerability scanning.

In some examples of the disclosed technology, a method of patch correlation includes correlating a set of two or more computer vulnerabilities that are resolved by the same software patch to group sets of rules on a per-bulletin basis and binding the set of computer vulnerabilities to at least one of the patch bulletins to produce correlated vulnerability scanning rules.

In some examples of the disclosed technology, a method of vulnerability paring by scanning for vulnerabilities in a specific order includes receiving a plurality of patch milestones having a specified ordering and designating a set of one or more vulnerability scanning rules having an associated scanning order, determining a current patch level and based on the current patch level for the target computer, selecting a set of one or more of but not all of the patch milestones, and evaluating the selected set of patch milestones, the evaluating comprising executing at least one of the vulnerability scanning rules associated with the selected set of patch milestones. If the current patch level matches the currently traversed patch milestone, then the computer is scanned based on vulnerabilities associated with the matching patch milestone. Conversely, if the current patch level does not match the currently traversed patch milestone, then the next patch milestone is traversed according to the specified supercedence order.

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures. Further, any trademarks used herein are the property of their respective owners.

BRIEF DESCRIPTION OF THE DRAWINGS

FIG. 1 illustrates a computer network environment in which certain disclosed embodiments can be implemented.

FIG. 2 is an exemplary vulnerability description, as can be used in certain embodiments of the disclosed technology.

FIGS. 3 and 4 are exemplary weakness descriptions, as can be used in certain embodiments of the disclosed technology.

FIG. 5 is a flow chart outlining an exemplary method of rule filtering, as can be used in certain embodiments of the disclosed technology.

FIG. 6 is a diagram illustrating rule forests having rule hierarchies and branches, as can be used in certain embodiments of the disclosed technology.

DETAILED DESCRIPTION

General Considerations

Figure 7:
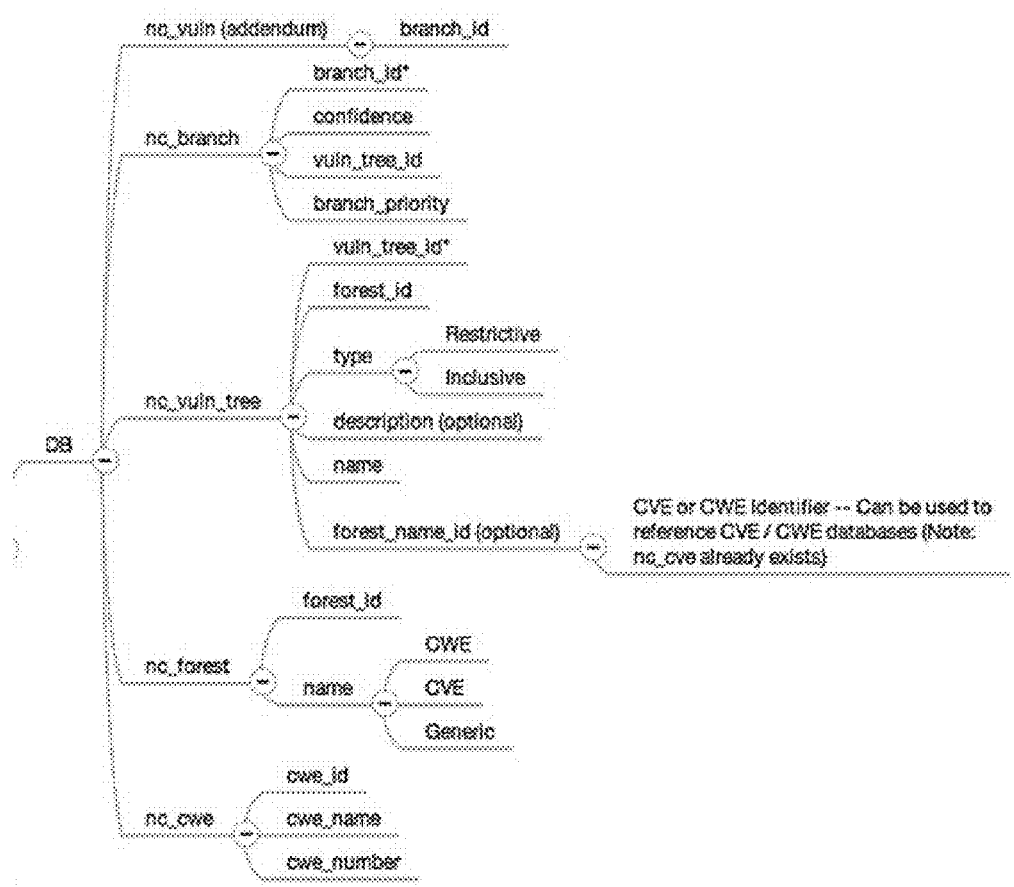
FIG. 7 depicts a conceptual ontology that can be used to implement certain examples of vulnerability filtering.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "vulnerability," "weakness," "scan," and "perform" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As used herein, "products" include computing objects that can be scanned for vulnerabilities, including software applications, drivers, and operating systems.

As used herein, "vulnerabilities" include specific computer security flaws and weaknesses that allow an attack to reduce a system's information assurance. As understood by one of ordinary skill in the relevant art, such vulnerabilities present an undesirable security risk, and can have a number of causes, including bugs (related to e.g., software, hardware and computer networks), machine configuration, hardware and software bugs. The term "vulnerability" is specifies a flaw in a particular software product (or a set of versions of a particular software product), while the term "weakness" refers to a more general description of a particular flaw that may be exhibited across multiple products, for example, HyperText Markup Language (HTML) injection or cross-site scripting weaknesses in a web server.

As used herein, the term "vulnerability rules" includes methods (e.g., software functions or procedures) that can be performed in order to determine the existence of one or more vulnerabilities. For example, executable code or instructions that cause a computer to determine the existence of a file or version of a file known to harbor a vulnerability is considered a vulnerability rule. The term "rule" encompasses both methods for determining the existence of vulnerabilities and weaknesses.

Figure 15:
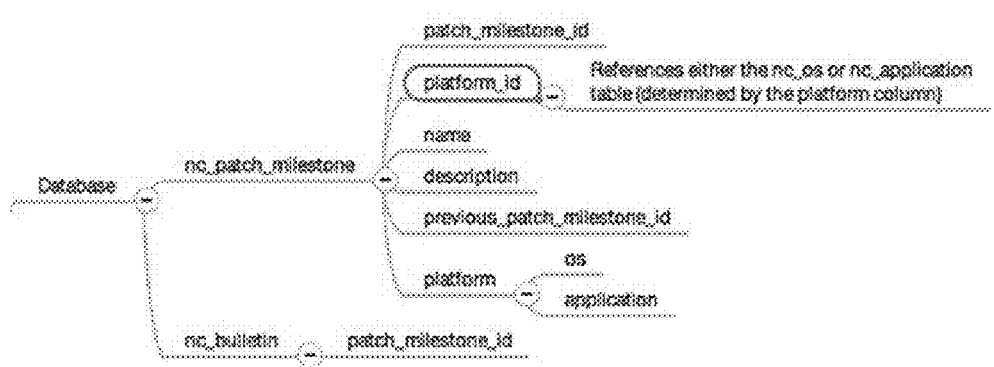
FIG. 15 depicts a conceptual ontology that can be used to implement certain examples of vulnerability paring.

Example Networking Environment for
Implementing Dynamic Vulnerability Capabilities An example of a possible network topology (e.g., a client-server network) for implementing disclosed dynamic vulnerability technologies is depicted in FIG. 1. As shown, a network diagram 100 illustrates a number of networked computing devices (e.g., laptops 110 and 111, desktop computers 112 and 113, touch screen tablets 114 and 115, and file servers 116 and 117). In some examples of the disclosed technologies, the networked computing devices do not host an agent, but are scanned for vulnerabilities by one or more central computers (e.g., a Vulnerability and Exposure management server 120 hosting a Device Profiler including network vulnerability technology and a vulnerability database 125) via a network (e.g., a local area network (LAN) 130, the Internet network 135, a wide area network, and/or other suitable computing network). For example, the vulnerability scanner 120 can open a connection to one or more of the computing devices using ssh (Secure Shell protocol), VPN (virtual private network) or other suitable technology. In some examples of the disclosed technologies, the networked computing devices host agent(s) processes that scan for vulnerabilities on each respective computing device and communicate with the one or more central computers (e.g., a monitor server 122 or the vulnerability database 125 (e.g., a vulnerability and exposure (VnE) manager database) via a network (e.g., a local area network (LAN) 130, the Internet network 135, a wide area network, and/or other suitable computing network). The computing devices and the central computer can have computer architectures as shown in FIG. 15 and discussed further below. The computing devices are not limited to traditional personal computers but can comprise other computing hardware configured to connect to and communicate with a network (e.g., smart phones or other mobile computing devices, servers, network devices, dedicated devices, and the like).

In the illustrated embodiment, the computing devices are configured to communicate with one or more central computers (e.g., the management server 120, the monitor server 122, and/or the vulnerability database 125). In certain implementations, the central computers execute software for performing some or all of the disclosed dynamic vulnerability correlation activities. For example, the central computers can transmit data to any of the computing devices (e.g., vulnerability definition information including vulnerability trees, patch correlation information, and vulnerability paring patch milestones) as well as receive data from any of the computing devices (e.g., reports identifying differences identified during scanning when using vulnerability filtering, patch correlation, or vulnerability paring). For example, the computing devices can receive vulnerability definitions from the management server 120, the monitor server 122, and/or the vulnerability database 125, as well as send reports (e.g., reporting vulnerability scanning results) to these central computers over the LAN 130 and/or Internet 135. In some examples, the vulnerability database 125 is controlled at least in part by a third party, such as a government, a corporation, or a standards-issuing body. In some examples, any of the computing devices can be used to create, view, and/or modify vulnerability definition information and to view scan reports using, for example, a graphical user interface.

Vulnerabilities can be expressed as a number of "forests" of rule hierarchies. For example, vulnerabilities can be grouped into a Common Vulnerabilities and Exposures (CVE) forest, a Common Weakness Enumeration (CWE) forest, and a generic forest. CVE provides a common enumeration of vulnerabilities and exposures in an information security environment to allow the use of a common names and identifiers. Providing common identifiers allows easier sharing of data across separate databases, tools, and services. One provider of CVE enumerations is the CVE editorial board, sponsored by the MITRE Corporation, although it will be readily apparent to one of ordinary skill in the art that the disclosed technologies can be used with similar CVEs provided by other sources. CVE enumerations allow vulnerability databases and other related capabilities to be linked together, as well as facilitating comparison of security tools and services. In some examples, CVE identifiers include an identifier number (e.g., CVE-1999-0067), a brief description of the associated vulnerability, and an optional number of references (e.g., links to vulnerability reports or OVAL identifiers).

FIG. 2 illustrates an example of data stored with a particular CVE vulnerability description. As shown, the CVE description 200 includes a unique name (CVE-2012-4558), a textual description that summarizes the nature of the vulnerability description, a status identifier, and a number of references to sources providing additional information on the CVE description. For example, the CVE description 200 of FIG. 2 includes references to descriptions for different specific operating system platforms as well as an Open Vulnerability and Assessment (OVAL) description. Additional information related to the CVE (for example, rules that can be applied by a vulnerability scanner to identify the existence of the vulnerability described by the CVE on a target computer) is not typically part of a CVE description (although they may be referenced in the description) and are not shown in FIG. 2.

CWE provides a dictionary of weaknesses (or errors) that can occur in the architecture, design, code, or implementation of software that can lead to exploitable security vulnerabilities. Examples of software weaknesses that can be described in a CWE dictionary include, but are not limited to: buffer overflows, format strings, structure and validity problems, common special element manipulations; channel and path errors, handler errors, user interface errors, pathname traversal and equivalence errors, authentication errors, resource management errors, insufficient verification of data, and code evaluation and injection. One provider of CWE lists is the MITRE Corporation, although it will be readily apparent to one of ordinary skill in the art that the disclosed technologies can be used with similar CWE lists and/or dictionaries provided by other sources.

FIGS. 3 and 4 illustrate two different CWE descriptions 300 and 400. As shown, each of the descriptions includes a unique identifier and a description of the described weakness. In some example, CWE descriptions can include references to associated vulnerability descriptions (e.g., CVE descriptions of one or more specific vulnerabilities related to the weakness description). In practice, one distinction between CWEs and CVEs is that a single CWE can be related to two or more specific CVEs.

Example Vulnerability Filtering

FIG. 5 is a flow chart 500 that outlines an exemplary method of vulnerability and/or weakness filtering, as can be used in some embodiments of the disclosed technology. Generally speaking, the concept of vulnerability hierarchies (e.g., vulnerability trees) allows the ability to flexibly and accurately filter which vulnerability scans are performed.

Rules within forests can be processed as follows. When traversing a tree marked as Restrictive, if a rule in a particular branch executes, then rules in subsequent branches will not execute. Use of trees marked Restrictive is a mode of operation more likely to be used for trees in the CVE forest. When traversing a tree marked as Inclusive, if rules in a particular branch do not execute, then rules in subsequent branches will also not execute. Use of trees marked as Inclusive is a mode of operation more likely to be used for trees in the CWE forest.

As is readily understood to those of ordinary skill in the art, an example forest can be implemented using data definitions provided with the publically-available CVE and CWE systems maintained by MITRE corporation.

FIG. 6 is a generalized diagram 600 that illustrates a simplified and generalized set of forests, including a number of rule hierarchies (as shown, vulnerability trees) that can be used with the method of vulnerability filtering outlined in the flow chart 500. Three forests 610, 650, and 690 are shown, although some embodiments can include fewer or more forests of vulnerability hierarchies. The CVE forest 610 is marked as being Restrictive, and includes a number of rule hierarchies (e.g., rule hierarchy 620 for scanning for CVE-2012-4558) for CVE vulnerabilities. The rule hierarchy 620 includes a number of rule branches (e.g., rule branches 630 and 631) that describe rules for determining the existence of the associated vulnerability (CVE-2012-4558). As shown, multiple rules can be used to identify the same vulnerability, the rules have been ordered so that the first rule branch 630 (a credentialed scan for affected versions of the application associated with the CVE vulnerability for the rule hierarchy 620) will be executed before the second rule branch 631 (a remote scan for affected versions of the application).

The CWE forest 650 is marked as being Inclusive, and includes a number of rule hierarchies (e.g., rule hierarchy 660 for scanning for weaknesses described by CWE-79 and rule hierarchy 661 for scanning for weaknesses described by CWE-80). Each of the rule hierarchies 660 and 661 includes a number of rule branches (e.g., rule branches 670 and 671 for rule hierarchy 660). The rule branches 670 and 671 are ordered such that the rules can be executed in the specified order.

The generic forest 690 is marked as being Inclusive, and includes a number of additional rule hierarchies for vulnerabilities and weaknesses not assigned CVE or CWE identifiers. Multiple generic forests can be used in some examples of the disclosed technology, and each of the forests can be marked Inclusive or Restrictive, depending on the types of rules stored with the rule hierarchies.

The forests, rule hierarchies, and rule branches shown in FIG. 6 have been depicted as trees for ease of explanation. As will be readily understood to one of ordinary skill in the art, other suitable data structures (e.g., hash tables, associative arrays, and/or database tables) can be adapted to provide the depicted forests, rule hierarchies, and rule branches in accordance with the disclosed technology.

Returning to the flow chart 500 of FIG. 5, at process block 510, a hierarchy of scanning rules (e.g., a hierarchy of vulnerability or weakness scanning rules) is selected for scanning. The scanning rules are ordered so that the scanning rules will execute in a desired order for testing a given vulnerability. For example, rules hierarchies such as those illustrated in FIG. 6 and described above can be selected from one or more forests for scanning.

A specific example can be used to illustrate the application of vulnerability filter. Some vulnerabilities in products can be determined based on the version of the application or operating system, or subcomponent thereof. Determining the version of a web server application can be accomplished using different scanning rules, but some rules are considered to be more reliable than others. Less reliable rules can be ordered such that execution is attempted only if other rules for scanning for a particular vulnerability fail.

For example, one technique for determining which version of Apache web server is running on a remote host is to run the Unix/Linux Apache command "httpd -v" locally on the remote host (e.g., using ssh, telnet, or other suitable method for running the httpd command locally) and parse the resulting output:

Server version: Apache/2.0.64
Server built: Dec. 22 2011 15:41:49

Scans (e.g., vulnerability scans and weakness scans) that use login information (or other suitable credentials) to access remote systems for examination are called "credentialed scans." As shown above, according to httpd, version 2.0.64 of Apache is running on the remote host.

Alternatively, if the httpd command cannot be run (e.g., because the remote computer is not accessible via ssh or there are inadequate to execute httpd) then analysis of banner information returned as a result of an HyperText Transfer Protocol (HTTP) HEAD command (sometimes called a "fingerprint") can, in some cases, be used to determine the version of Apache running on the remote host:

HTTP/1.1 200 OK
Date: Fri, 27 Dec. 2013 22:16:09 GMT
Server: Apache/2.0.64 (Unix) mod_ssl/2.0.64
OpenSSL/0.9.7d-p1
Last-Modified: Mon, 22 Mar. 2010 19:06:38 GMT
ETag: "1648f35-1187-6580eb80"
Accept-Ranges: bytes
Content-Length: 4487
Content-Type: text/html As shown above, according to httpd, version 2.0.64 of Apache is running on the remote server. Vulnerability scans that are based on analysis of systems performed without logging in to the remote system being scanned are called remote scans. However, remote scans, such as analysis of an http banner may be less desirable for a number of reasons. Some websites may spoof or otherwise modify the version information, rendering the information useless. Some websites may be configured to not provide the desired information. Further, the returned information (e.g., banner information) may be intercepted or modified between the remote host and the scanning host.

In some implementations of the disclosed technology, vulnerability filtering can be performed using one or more "forests" to facilitate application and analysis of vulnerability rules. In some examples of the disclosed technology, three forests of rules are used: a Common Vulnerabilities and Exposures (CVE) forest, a Common Weakness Enumeration (CWE) forest, and a Generic forest. Each of these forests contains n hierarchies (e.g., trees) and each hierarchy can contain m branches. Each of the trees can be marked as being Restrictive or Inclusive. Within a tree, each branch is assigned a priority, which determines the branch execution order. Each branch can also be assigned a confidence level. For example, some branches can assign branches with Deep Reflex Testing (DRT) rules a higher confidence level than branches with remote banner checks.

After selecting the hierarchy of vulnerability scanning rules, the method proceeds to process block 520, where an attempt is made to execute the first rule in the scanning rule hierarchy selected at process block 510. The execution of the rule can be performed remotely (e.g., from a vulnerability scanning appliance operating over a computer network), locally (e.g., by executing a credentialed scan to gain access to the target computer being scanned and executed rule code locally), or in local and remote combinations. Once the attempt to execute the rule has been made, any status information produced by the rule (e.g., exit codes, logs, piped data, or other data returned from the rule) is stored at least temporarily so that the rule execution can be evaluated, and the method proceeds to process block 530.

At process block 530, the method checks to determine whether the rule hierarchy corresponding to the executed rule has been designated as "Restrictive" or "Inclusive." The designation can be determined at the rule hierarchy level, but is typically designated for a set of rules (e.g., a forest of CVE rule hierarchies can be designated as Restrictive). For Restrictive rule hierarchies, the method proceeds to process block 540, while conversely, the method proceeds to process block 550 for Inclusive rule hierarchies.

At process block 540, the method checks to determine whether the (Restrictive) rule that was attempted to execute at process block 520 was successful. If it is determined that the rule did not execute successfully, then the method proceeds to process block 520 to execute the next rule in the rule hierarchy, according to the specified order. Conversely, if it is determined that the rule did execute successfully, then the method proceeds to process block 560.

At process block 560, execution of rules in the current rule hierarchy stops, and the method proceeds to process block 510 to process another hierarchy of scanning rules. Other acts corresponding to the current rule hierarchy can take place at process block 560. For example, results can be stored in a scanning database or reported in a log file. It should be noted that whether a rule executes successfully is not necessarily related to finding the associated vulnerability or weakness. For example, if an attempt at performing a credentialed scan of a target machine fails, the existence (or non-existence) of a vulnerability is not yet known. Additional rules can be subsequently executed in order to detect the targeted vulnerability. For example, as discussed above regarding Apache vulnerabilities, one way to determine a version of a software application is to remotely login to a target machine and perform a local version check. However, if that local check is not possible, other analysis, (e.g., analyzing data returned by the web server with a remote scan) may be able to determine the existence or non-existence of the vulnerability.

At process block 550, the method checks to determine whether the (Inclusive) rule that was attempted to execute at process block 520 was successful. If it is determined that the rule did execute successfully, then the method proceeds to process block 520 to execute the next rule in the rule hierarchy, according to the specified order. Conversely, if it is determined that the rule did not execute successfully, then the method proceeds to process block 560.

An example illustrates why it is desirable to mark some rule hierarchies as Inclusive. HTML injection (injection of malicious code in HTML using a <SCRIPT>, <OBJECT>, <APPLET>, or other suitable tag is a well-known security weakness in web servers. Cross-site scripting attacks (known as CSS or XSS attacks) are another security weakness, however, such XSS attacks are not possible if HTML injection cannot be performed on a particular web server. Thus, when scanning a target machine for weaknesses, if a rule for testing HTML injection does not execute, then executing a rule for XSS attacks is superfluous, as the ability to perform HTML injection must be available to allow an XSS attack. Hence, scanning a number of rule hierarchies containing rules for checking weaknesses in a specified order can proceed to the next hierarchy once a first rule cannot be executed.

FIG. 7 is an illustration of a conceptual ontology 700 for implementing some embodiments of dynamic vulnerability correlation, including vulnerability filtering. In some examples, the ontology is stored in a database, which can be remote or local from a Device Profiler configured to performing scanning, that stores the structures as tables in the database. The database can include tables, fields, and values defined to implement the disclosed dynamic vulnerability correlation technologies. In some examples, the ontology is not limited to data values, but can also include machine-executable code (e.g., written in Python or another scripting language) to describe relations in the ontology, scanning rules, and report scanning results. In some examples, other suitable data structures (e.g., trees or associative arrays) can be configured the ontology data.

As shown in FIG. 7, the ontology 700 includes structures (e.g., database tables) for nc_vuln, including a branch_id identifier that identifies one or more rule branches associated with the vulnerability associated with nc_vuln. The vulnerability tree is represented by three distinct structures reflecting the tree's hierarchy: nc_forest, nc_vuln_tree, and nc_branch. Additionally, nc_cwe is a structure (used for defining CWE weaknesses, as opposed to vulnerabilities such as CVE vulnerabilities identified by nc_vuln) that includes an identifier cwe_id, a name cwe_name, and a number cwe_number.

As shown in FIG. 7, the nc_forest structure includes an identifier forest_id and an associated forest name (as shown, enumerated to be one of CWE, CVE, or Generic). Also shown is nc_vuln_tree, an example of a rule hierarchy that includes the fields vuln_tree_id, forest_id, its type (Restrictive or Inclusive), an optional description, a name, and an identifier forest name id. The nc_branch structure includes a branch_id, used to tie vulnerabilities to rule branches, a confidence level that can be used in some examples of vulnerability filtering, a vuln_tree_id identifier, and a branch priority field that can be used to specify the order in which rules in a particular branch are executed.

As will be readily understood to one of ordinary skill in the art, the ontology 700 illustrated in FIG. 7 is a generalization, and in some examples additional structures can be included, or other structures and arrangements used to implement vulnerability filtering.

Figure 8:
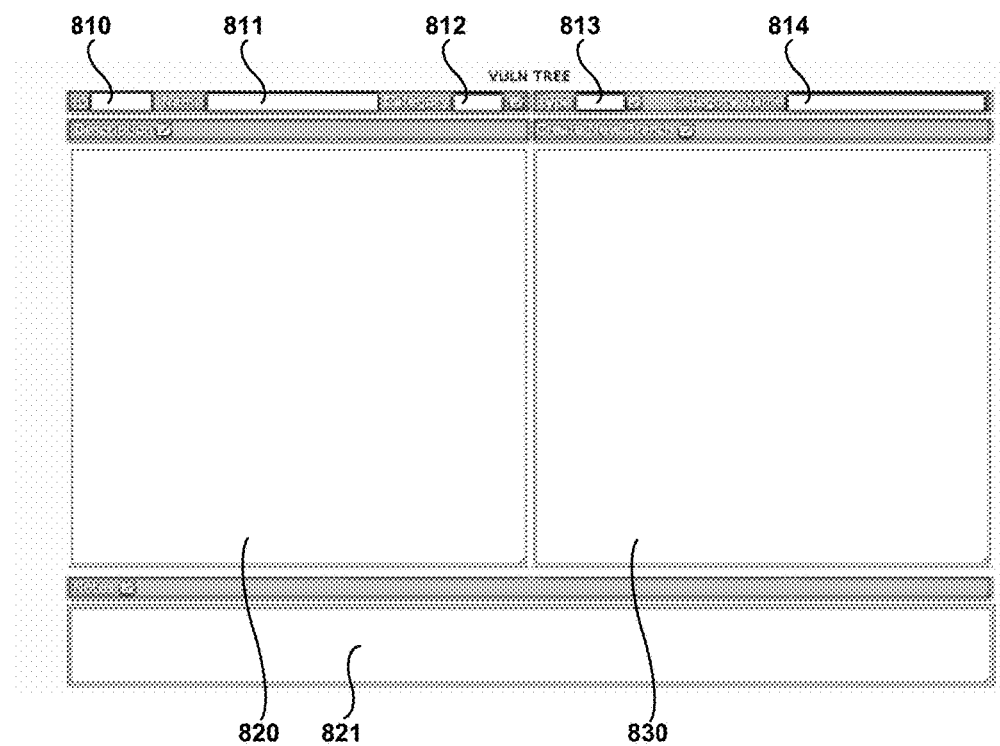
FIG. 8 depicts a graphical user interface that can be used to create and modify scanning rule hierarchies.

FIG. 8 illustrates an example graphical user interface 800 that can be used to create, modify, and view rule hierarchies, such as vulnerability and weakness hierarchies, as can be used in certain embodiments of the disclosed technology. In particular, the illustrated graphical user interface 800 provides input controls 810-814 for defining an ID, Name, Category (e.g., CVE, CWE, or Generic), Type (e.g., Restrictive or Inclusive), and Category Name, respectively. Input fields 820 and 821 for adding a Description and Notes are also shown. New rule branches, and the order in which the rules should attempt to executed, can be specified using the appropriate control 830. The user interface screen can also employ the use of a dialog box for creating new branches in some examples.

Some implementations of vulnerability filtering include using a graphical user interface for defining rules, configuring operation, and viewing results. Rules and data defining the forests can be stored in a networked or non-networked database. In some examples, a profile implements disclosed scan methodologies on a per-tree basis. In some examples, system administrators can configure the vulnerability scan tool to select a confidence value in applying rules defined within the forests. That is, the confidence level assigned to a rule, or a rule hierarchy, can be compared to the selected confidence level to determine whether to run the rules, the order in which to run rules, and/or whether to execute additional rule branches associated with a rule hierarchy.

Thus, by applying vulnerability filtering using rule hierarchies (e.g., vulnerability trees marked as Restrictive or Inclusive), scan times can be improved, as fewer rules will need to be evaluated in each tree, which in turn will decrease the overall number of rules executed. Redundant rules can also be removed from the system, further decreasing scan time. For example, based on Advanced Security Profiling Language (ASPL) version 465, published by Tripwire, Inc. (ASPL-465), there are 34,685 shipping vulnerabilities associated with CVEs, but there are only 18,898 unique CVEs.

In some examples of vulnerability filtering, use of multiple ontologies can be eliminated in favor of a single ontology. In some examples, additional situation-specific ontologies can be used (e.g., a Payment Card Industry (PCI) ontology) along with more general ontologies (e.g., CVE, CWE, and/or generic ontologies). Some ontologies place can utilize Deep Reflex Testing (DRT) rules in high priority, high confidence branches and place remote rules in lower priority, low confidence branches. This allows system administrators more selection in which rules are run, and how the rules are run.

In some examples of vulnerability filtering, network utilization is also reduced. Since fewer vulnerability rules are evaluated, less data is sent across the network. In some examples of vulnerability filtering, a Device Profiler is modified to honor the vulnerability tree logic. In some implementations, schema changes describing the vulnerability database are used, and can result in a new version of the ontology being generated.

In some embodiments, an initial bulk loading can be completed by generating scripts to scan the ontology database and create trees with two branches based on CVE. A first branch is loaded with higher-confidence rules while a second branch is loaded with lower-confidence rules. Any vulnerability without a CVE is initially loaded into the GENERIC forest until CWE binding is performed. In some examples, this functionality is expanded by providing optional AND/OR functionality between branches, instead of being defined at a per-tree level.

Example Patch Correlation

Generally speaking, patch correlation allows the correlation of two or more vulnerabilities that are resolved by the same software patch. Software patches, and/or vulnerabilities and weaknesses (e.g., CVEs and CWEs) associated with a respective software patch, are often distributed with a software bulletin that outlines changes and fixes to correct vulnerabilities and weaknesses identified in a particular software product. In some cases, a third party, such as a Vulnerability Exposure Research Team (VERT) provides software bulletins, while in others, the software product vendor provides software bulletins.

Plural vulnerabilities can be grouped into sets of rules on a per-bulletin basis, rather than a per-vulnerability basis. In some examples, a full set of rules can be created, bound to a bulletin, and associated with one or more vulnerabilities. In some examples, this approach to performing patch correlation allows implementation of patch reporting, in addition to or instead of vulnerability reporting. Such implementations are desirable to some system administrators. In some examples, patch correlation takes advantage of the concept of patch supersedence, whereby vendors of software products provide patches that supercede others. For example, if a patch supercedes an earlier-released patch, the need to check for vulnerabilities and weaknesses specific to the earlier patch can be obviated.

Figure 9:
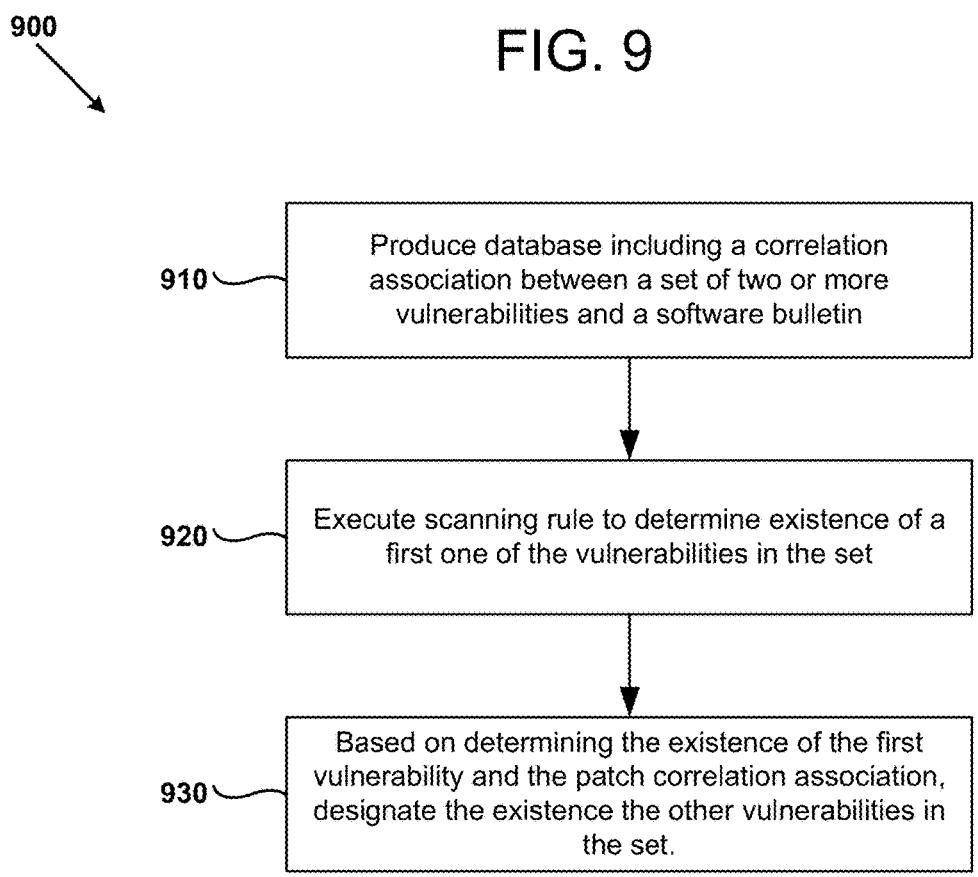
FIG. 9 is a flow chart outlining an exemplary method of patch correlation, as can be used in certain embodiments of the disclosed technology.

FIG. 9 is a flow chart 900 that outlines an exemplary method of dynamic patch correlation, as can be used in some embodiments of the disclosed technology.

At process block 910, a database is produced that includes correlation association between a set of two or more vulnerabilities and a software bulletin. For example, identifiers for a number of CVEs and a corresponding software bulletin can be associated by an entry in the database. The software bulletin typically corresponds to a software version or patch version for the software product. In some examples, the correlation associations are generated for the database by a software vendor, and accompany a release of a software product or patch, while in other examples, the associations can be generated by a third-party provided of information security products and services.

Figure 10:
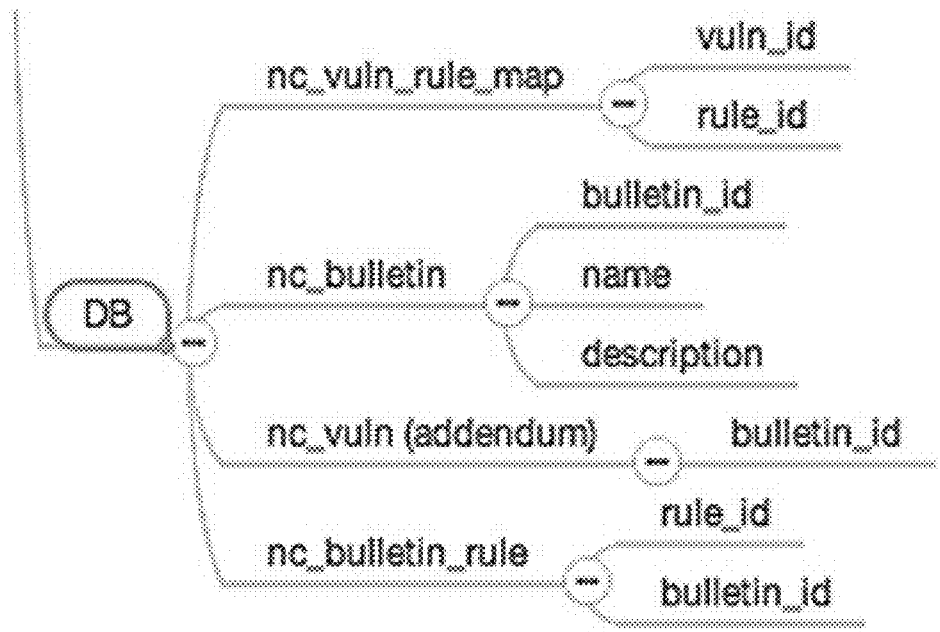
FIG. 10 depicts a conceptual ontology that can be used to implement certain examples of patch correlation.

FIG. 10 is an illustration of a conceptual ontology 1000 for implementing some embodiments of dynamic vulnerability correlation, including patch correlation as outlined in FIG. 9. As shown, the ontology 1000 includes structures for nc_vuln_rule_map, nc_bulletin, nc_vuln, and nc_bulletin_rule. The structures shown illustrate a simple example, and in some cases, more detailed information and relationship may be included in the ontology 1000. As shown in FIG. 10, the nc_vuln_rule_map structure includes mappings between particular vulnerability identifiers (e.g., as described in a CVE, CWE, or other vulnerability hierarchy) and rule identifiers that indicate methods for testing for the respective mapped vulnerabilities. The nc_bulletin structure contains information related to individual software bulletins (e.g., information describing a product version or patch), including an identifier bulletin_id, a name, and a description. The nc_vuln structure includes information describing a particular vulnerability and an identifier of one or more associated bulletin identifiers (bulletin_id) that affect the associated vulnerability (e.g., a patch for preventing the associated vulnerability). The nc_bulletin_rule structure maps one or more vulnerability rules (rule_id) to an associated bulletin_id. As will be readily understood to one of ordinary skill in the art, the schema 1000 illustrated in FIG. 10 is a generalization, and in some examples additional structures can be included, or other structures and arrangements used to implement patch correlation.

After a database is produced that includes associations between vulnerabilities and a software bulleting, the method proceeds to process block 920.

At process block 920, one or more scanning rules associated with vulnerabilities in the database are executed to determine the existing of one or more vulnerabilities. In some examples, the associated techniques of vulnerability filtering and/or vulnerability paring can be used in conjunction with the scanning, although this combination is not required. In some examples, executing the scanning rules includes execution of methods such as credentialed scanning or remote scanning. Once the existence of one or more vulnerabilities has been determined, the method proceeds to process block 930.

At process block 930, other vulnerabilities (besides those determined at process block 920) referenced in the database are designated to be existing in the system being analyzed. These other vulnerabilities are determined based on the correlation association in the database produced at process block 910 and its mapping to the vulnerabilities determined at process block 920.

For example, the designation at process block 930 can be performed using a database defined according to the representative ontology 1000. Once a vulnerability is identified (e.g., by the vulnerability identifier nc_vuln), its corresponding bulletin identifier (bulletin_id) is found in the database. Then, using the mapping defined in the nc_vuln_rule_map and nc_bulletin rule structures, a number of other vulnerabilities associated with the corresponding bulleting are identified and designated as existing in the system being scanned.

Once one or more vulnerabilities have been designated according to the method of FIG. 9, execution of rules associated with identified the designated vulnerabilities can be skipped. This is due in part because the presence of one vulnerability associated with a bulletin typically indicates the existence of the other vulnerabilities associated with that bulletin in the database. Hence, computing resources can be conserved and scanning time reduced by avoiding additional scans for the designated vulnerabilities.

In some examples of the disclosed technology, a patch correlation method includes caching a number of rules associated with a set of software patches. Additional rule executions and cache hits are then removed or ignored. Requirements related to patch supersedence can also be removed or ignored.

Figure 11:
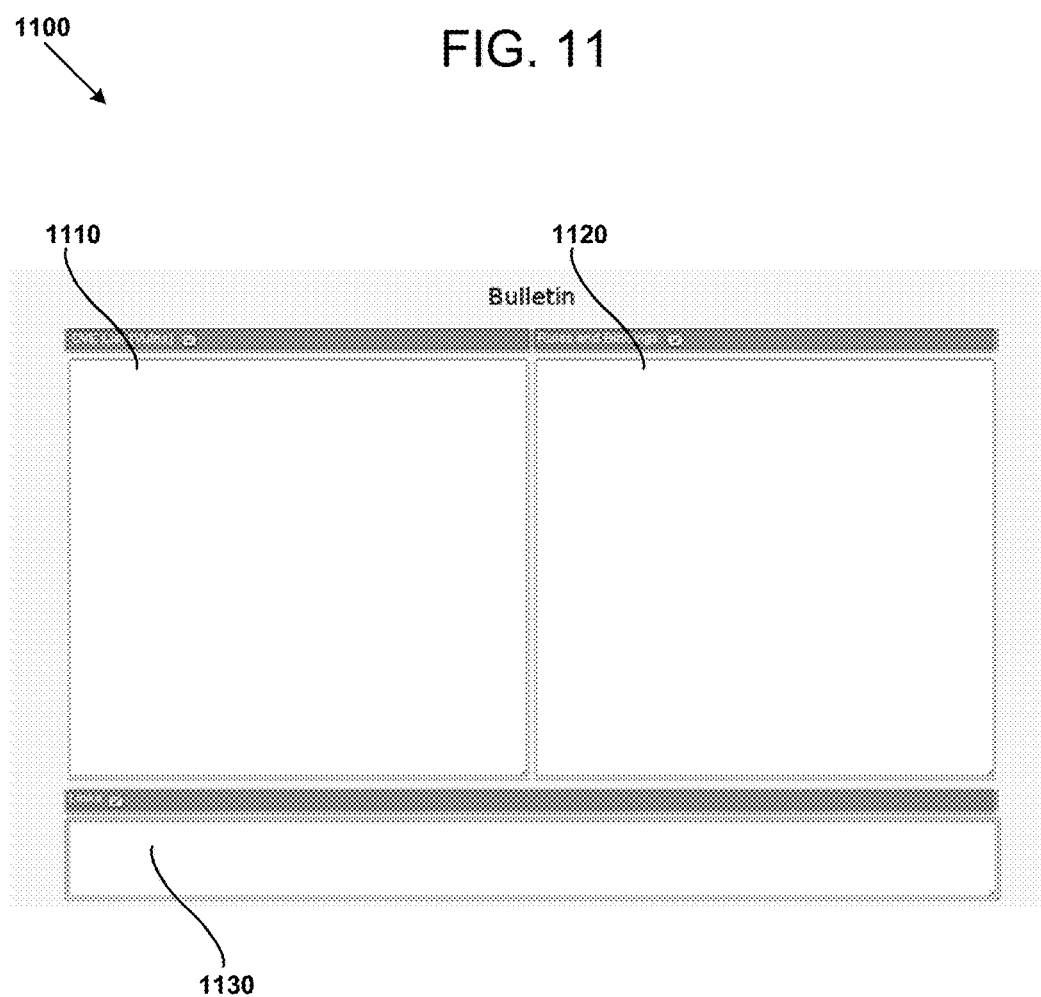
FIG. 11 depicts a graphical user interface that can be used to create and modify scanning rule bulletins.

In some examples, a Bulletin Management System is employed, and a reporting system includes technology for determining the correct information to report. FIG. 11 illustrates an example graphical user interface that can be used to create, modify, and view patch vulnerability bulletins, as can be used in certain embodiments of the disclosed technology. In particular, FIG. 11 illustrates a user interface window 1100 for creating a new bulletin. A list of CVE vulnerabilities can be displayed in the left-hand column 1110 of the window 1100, and a list of rules and their vulnerability bindings can be displayed in the right column 1120. A list of links between the vulnerabilities listed in the left-hand column 1110 and the rules and their bindings displayed in the right-hand column can be displayed in the lower pane 1130. In some examples, the name and a description of the bulletin is displayed at the top of the page. A drag and drop interface (or any other suitable interface) can be used for associating specific rules/bindings with specific CVEs or other vulnerabilities using the user interface window 1100. It should be noted that the interface presented in FIG. 11 is an example, and that other methods of establishing correlations, for example, scripts, programs, or text editing, can be used to generated correlation associations for a correlation database.

Figure 12:
FIG. 12 depicts a graphical user interface that can be used to create and modify scanning rule bulletins.

FIG. 12 illustrates an example graphical user interface 1200 that can be used to create, modify, and view patch vulnerability bulletins, as can be used in certain embodiments of the disclosed technology. In particular, the graphical user interface 1200 of FIG. 12 illustrates user interface controls for modifying and displaying information about vulnerability definitions, including a control 1210 for invoking a tool to modify correlation associations between the displayed vulnerability, its associated bulletin(s), and/or any associated rules for detecting the vulnerability. In addition, the user interface 1200 can include similar interface features for a displaying and modifying patch milestones used to perform vulnerability paring, as outlined further below.

In different embodiments employing patch correlation, a number of desirable advantages can be realized. In some examples, patch correlation can be used to improve vulnerability scan times by reducing the number of rules that need to be executed during a vulnerability scan based on determining the existence of other vulnerabilities associated with a software bulletin.

In some examples, patch correlation can be used to improve vulnerability and exposure research team (VERT) development times by simplifying the generation of multiple vulnerabilities, thereby decreasing rule development time. In some examples, patch correlation can be used to improve patch reporting, as it allows missing patches to be reporting in addition to vulnerabilities detected using correlation associations.

In some examples, patch correlation can be used to decrease network utilization. As fewer rules are executing during vulnerability scanning, less data is sent across the network. In some examples, implementations of patch correlation include changes to ontologies defined in one or more vulnerability databases.

Example Vulnerability Paring

Some embodiments of the disclosed dynamic vulnerability correlation technology employ a technique called vulnerability paring, in which vulnerabilities are scanned for in a specified order to minimize the number of conditions that you need to test. In some examples, vulnerability paring includes defining "patch milestones" (e.g., rollups of service packs, updates, or other suitable milestones) and determining the order in which to execute vulnerability rules based on the defined milestones. Thus, by paring the number of vulnerabilities that scans are performed for, vulnerability scanning performance can be improved.

Figure 13:
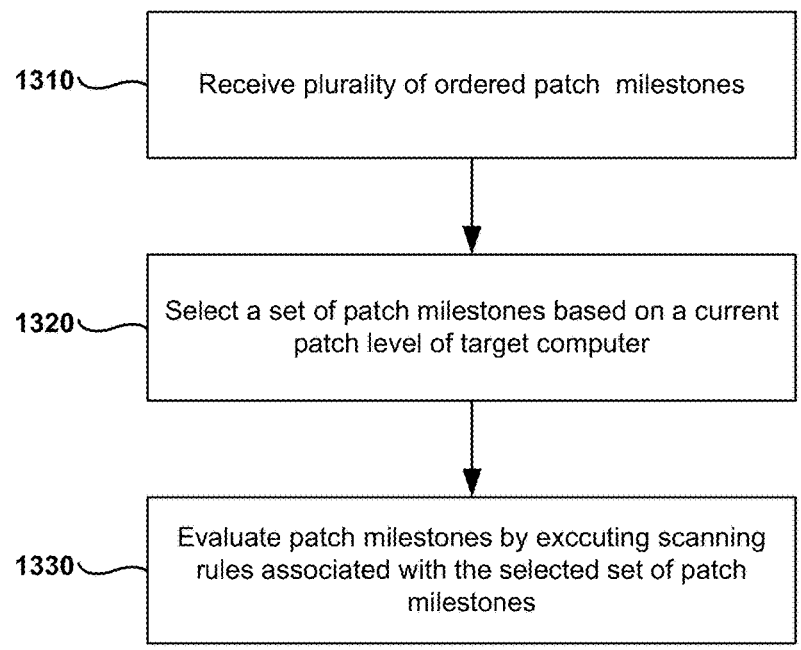
FIG. 13 is a flow chart outlining an exemplary method of vulnerability paring, as can be used in certain embodiments of the disclosed technology.

FIG. 13 is a flow chart 1300 that outlines an exemplary method of vulnerability paring, as can be used in some embodiments of the disclosed technology. For example, vulnerability paring can be combined with a vulnerability scanning process operating on a target system that is scanned by a local agent or by a remote scanning Device Profiler.

At process block 1310, a plurality of ordered patch milestones is received. Each of the patch milestones designates a set of one or more vulnerability scanning rules having an associated scanning order. The software patch milestones describe group of software patches for a software product (e.g., a Microsoft Windows operating system Service Pack milestones, sub-milestones, or individual patches). In some examples, the patch milestones describe patches for one or more versions of a software applications, or patches for other software products. The milestones can then be traversed according to their ordering in order to pare which vulnerability scans are performed on the target machine (e.g., by not running vulnerability scans for milestones that either have been superceded by the current patch level of the scanned target machine, or that are not relevant because the current patch level is not as recent as the patch milestone). The patch milestones received at process block 1310 can include a hierarchy of patch sub-milestones, as well as number of individual patch descriptions associated with vulnerability scanning rules.

In some examples, the correlation associations are generated for the database by a software vendor, and accompany a release of a software product or patch, while in other examples, the associations can be generated by a third-party provider of information security products and services. The specified traversal order will be used in examining vulnerabilities associated with particular patch milestones. Typically, there are multiple (e.g., up to hundreds or thousands of software patches) patches that occur between the produced patched milestones.

Figure 14:
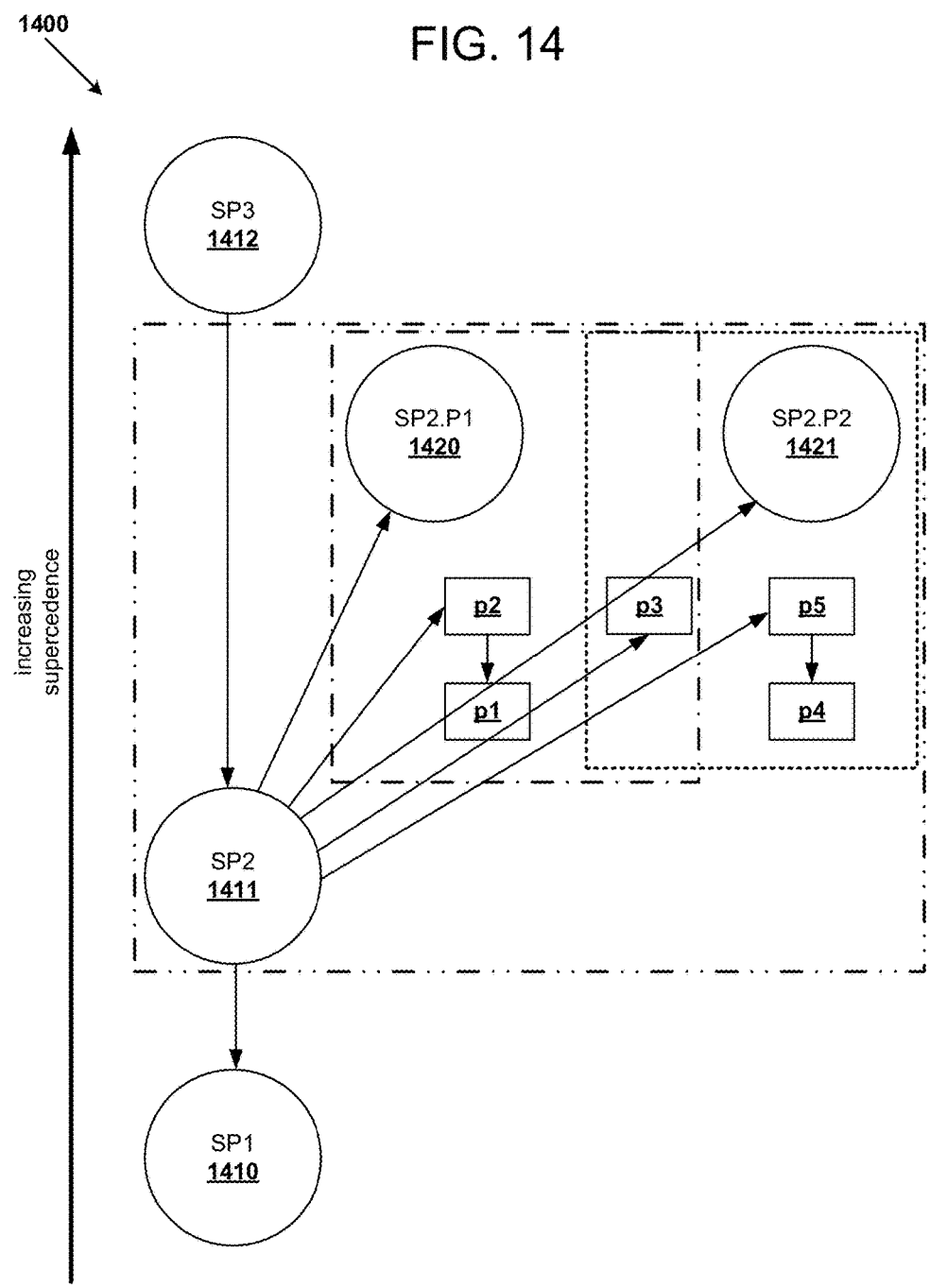
FIG. 14 is a diagram illustrating an order of patch milestones, as can be used in certain embodiments of the disclosed technology.

FIG. 14 is a diagram 1400 that depicts a number of collections of patches and milestones, as can be used in some examples of vulnerability paring, including the method outlined in the flow chart 1300. As shown in FIG. 14, the milestones (e.g., milestones 1410-1412 and sub-milestones 1420 and 1421) and associated patches (e.g., patches p1-p4) are loosely ordered according to increasing supercedence. For example, a first milestone 1410 (corresponding to Service Pack 1 (SP1)) is superceded by a second milestone 1411 (corresponding to Service Pack 2 (SP2)), which in turn is superceded by a third milestone 1412 (corresponding to Service Pack 3 (SP3)). The second milestone 1411 includes an association with two subsequent sub-milestones 1420 (corresponding to SP2.P1) and 1421 (corresponding to SP2.P2). In other words, over the life cycle of a software product, it is typical that once a milestone (such as Service Pack 2) is released, a number of sub-milestones (e.g., 1420 and 1421) may be released before the next milestone (as shown, milestone 1412). Further, each sub-milestone is associated with a number of software patches: sub-milestone 1420 (SP2.P1) is associated with patches p1, p2, and p3, while sub-milestone 1421 (SP2.P2) is associated with patches p3 and p4. While the milestones are often ordered according to the chronological order in which software patches are released, in some examples, the milestones can be arranged according to other suitable orderings.

It should be understood that on typical systems, each software product can have many milestones, sub-milestones, and patches (e.g., on the order of thousands of software patches for an operating system), and these have been omitted from FIG. 14 for clarity.

After the set of software patch milestones has been received, the method proceeds to process block 1320.

At process block 1320, a current patch level for a target computer is determined and, based on the current patch level for the target computer, some of the patch milestones received at process block 1310 are selected. At least some of the patch milestones received at process block 1310 are not selected based on the ordering of the patch milestones and the current patch level. For example, if a particular patch milestone is ordered to indicate that it supercedes the patch milestone associated with the current patch level, then that particular patch milestone is not selected. Similarly, if there are patch milestones that do not apply to the target machine (e.g., because the patch milestones apply to a patch level that is not installed on the target machine), then those patch milestones are not selected.

The selecting can include traversing the patch milestones according to their ordering until the current patch level for the target system corresponding to one of the patch milestones is determined. Determination of the current patch level for the target machine can be performed in a number of different ways, for example, by querying system functions or analyzing data stored in a system registry.

For example, the ordered patch milestones illustrated in the diagram 1400 of FIG. 14 can be traversed as follows. A device profiler determines that the current patch level for the target machine is SP2. The device profiler thus skips the third (highest level) patch milestone 1412 and selects the second patch milestone 1411. In this example, the second patch milestone 1411 corresponds to the current patch level of the machine (Service Pack 2). The second patch milestone 1411 includes two patch sub-milestones 1420 and 1421. If the patch associated with the sub-milestone 1420 is determined to be installed on the machine, then the individual patches associated with this sub-milestone 1420 (patches p1, p2, and p3) are determined to be installed and hence, the associated vulnerability scanning rules for the set of patches do not need to be executed. However, if the patch associated with the sub-milestone 1421 is determined not to be installed on the target machine, then the device profiler proceeds to traverse individual patches p5 and p4 according to their specified ordering. Thus, as shown, patch p5 (the more recent patch) will be evaluated before patch p4. Patch p3, which is also associated with sub-milestone 1421, does not need to be evaluated, and thus is not selected, because patch p3 is also a part of the sub-milestone 1420.

Once the set of patch milestones (and any sub-milestones and patches) to be evaluated are selected based on the current patch level of the target machine, the method proceeds to process block 1330.

At process block 1330, the selected set(s) of patch milestones from process block 1320 are evaluated. This evaluating includes determining software patches installed on the target system and scanning for vulnerabilities associated with the current patch milestone (including sub-milestones). The scanning is performed according to the order specified with the patch milestones produced at process block 1310, proceeding from the higher level patches (e.g., later patches) associated with the current patch level (determined at process block 1320) to lower level patches (e.g., older patches) associated with the current patch milestone.

For the example diagram 1400 shown in FIG. 14 and current patch level discussed above regarding process block 1320, the vulnerability scanning rules associated with patches p4 and p5 are executed on the target machine, but the vulnerability scanning rules associated with patches p3, p2, and p1 are not evaluated, based on the current patch level of the target machine and the ordering of milestones (including milestones 1410-1412 and sub-milestones 1420 and 1421) in the ordered milestones received at process block 1310. Thus, scanning times can be increased by paring the number of scans to be executed to a selected set of milestones.

A Device Profiler can be used to determine the latest patch milestone for a given product (e.g., an application or an operating system) and then scanning will be performed based on the patch milestones. In some examples, patch milestones are defined generally for an application or operating system, while in others, the patch milestones are specified for one or more particular versions or releases of a particular application or operating system.

Using the specified patch milestone, the Device Profiler can scan for the latest patch milestone first. If that milestone exists, then scanning is initiated using the latest patch and then the Device Profiler can scan back to the latest patch. If the milestone is not found, a previous milestone is searched for, and, once a milestone has been found, logic associated with milestone is applied until the vulnerability state of the system has been determined.

An example application tree for scanning a system, where the current patch milestone for a software product (Microsoft Windows® XP) is Service Pack (SP) 3 is shown below Table 1:

TABLE 1

Scan for Windows XP Service Pack 3
  If Service Pack 3:
    Scan from latest patch back to the oldest post-SP3 patch.
  If NOT Service Pack 3:
    Scan for Windows XP Service Pack 2
      If Service Pack 2:
        Scan from latest post-SP2 patch back to the oldest post-SP2 patch.
      If NOT Service Pack 2:
        Scan for Windows XP Service Pack 1
          If Service Pack 1:
            Scan from latest post-SP1 patch back to the oldest post-SP1 patch.
          If NOT Service Pack 1:
            Scan for remaining patches.

In some examples, a Device Profiler is employed to implement the vulnerability paring methodology outlined in FIG. 13. In some examples of the disclosed technology, a graphical user interface can be employed to display a patch milestone management page to provide the ability to add, edit, and delete patch milestones, and a bulletin management page can be used to associate patch milestones with bulletins. For example, graphical user interfaces similar to those illustrated in FIGS. 11 and 12 and discussed further above can be adapted for managing patch milestones to be used in vulnerability paring.

In some examples of the disclosed technology, the patch milestones and/or patch sub-milestones include an association with a software bulletin. Using this information, vulnerabilities discovered by executing the vulnerability scanning rules can be reported on a per-milestone (or per sub-milestone) basis, further aiding system administrators in analyzing vulnerability scanning results.

FIG. 15 is an illustration of a conceptual ontology 1500 for implementing some embodiments of dynamic vulnerability correlation, including vulnerability paring as outlined in FIG. 13. As shown, the ontology 1500 includes structures for nc_patch_milestone and nc_bulletin. As shown in FIG. 15, the nc_bulletin structure includes a reference to a corresponding patch_milestone_id associated with the bulletin described in nc_bulletin. The patch_milestone_id can be used to identify characteristics associated with a particular nc_patch_milestone, as illustrated in FIG. 15.

The nc_patch_milestone structure includes a number of structures, including a name, a description, and an enumerated platform field indicating whether a particular nc_patch_milestone is for an operating system or an application. Also included with the nc_patch_milestone of FIG. 15 is a patch_milestone_id (used to cross-reference bulletins and other related data), a platform_id (which references an associated nc_os or nc_application table, as determined by the platform associated with the particular nc_patch_milestone). Another structure is previous_patch_milestone_id, which includes a pointer to the previous patch milestone for the current product (operating system or application). Thus, a number of patch milestones can be traversed by referencing a chain of previous patch milestones, thereby specifying the ordering of the patch milestones.

In some examples of vulnerability paring, scanning time is improved by limiting the number of vulnerabilities that are scanned to accurately detect conditions on a host. In some examples of vulnerability paring, network utilization is also decreased, as evaluating fewer rules means less data is sent across the network. In some examples, ontologies (e.g., in a vulnerability database) are modified with a new ontology package.

Figure 16:
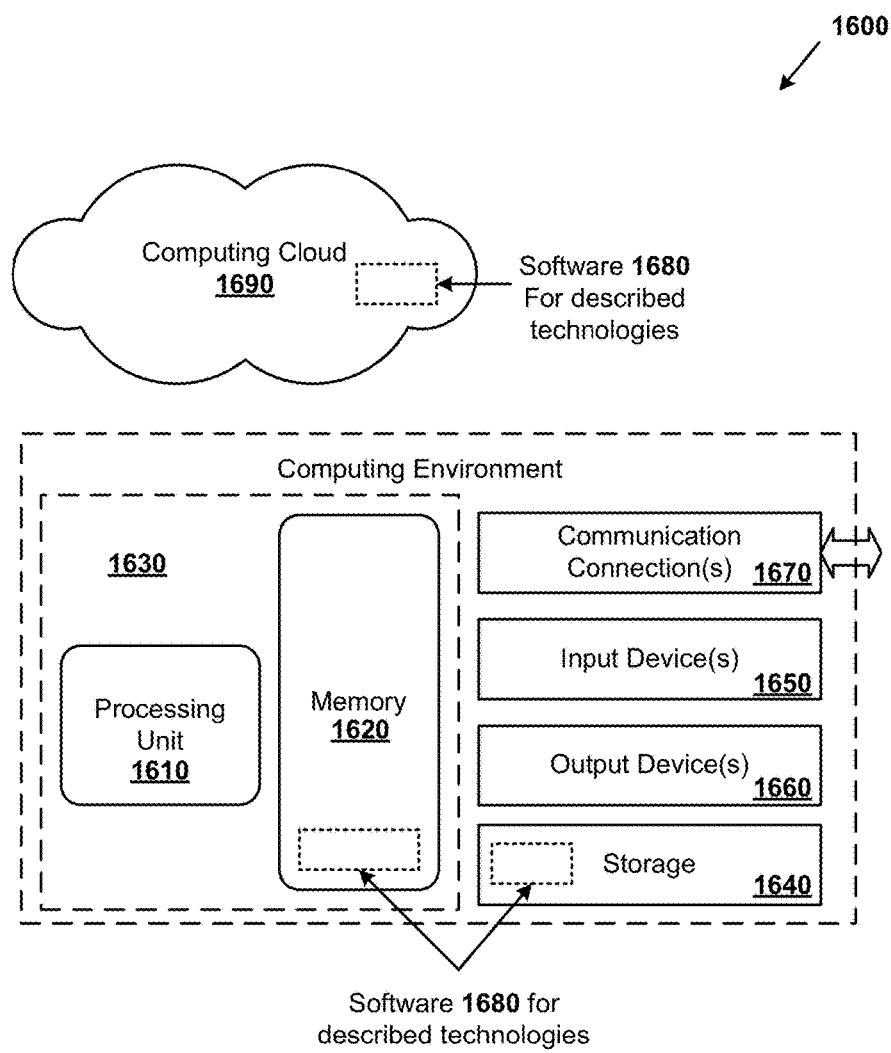
FIG. 16 illustrates a generalized example of a suitable implementation environment for a disclosed methods and apparatus, including dynamic vulnerability correlation technologies.

Example Computing Environments for Implementing Embodiments of the Disclosed Technology FIG. 16 illustrates a generalized example of a suitable computing environment 1600 in which described embodiments, techniques, and technologies, including reporting agents and monitor servers, can be implemented. For example, the computing environment 1600 can implement dynamic vulnerability correlation actions, such as vulnerability filtering, patch correlation, and vulnerability paring, as described herein.

The computing environment 1600 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 16, the computing environment 1600 includes at least one central processing unit 1610 and memory 1620. In FIG. 16, this most basic configuration 1630 is included within a dashed line. The central processing unit 1610 executes computer-executable instructions and may be a real or a virtual processor. In a multi-processing system, multiple processing units execute computer-executable instructions to increase processing power and as such, multiple processors can be running simultaneously. The memory 1620 may be volatile memory (e.g., registers, cache, RAM), non-volatile memory (e.g., ROM, EEPROM, flash memory, etc.), or some combination of the two. The memory 1620 stores software 1680, images, and video that can, for example, implement the technologies described herein. A computing environment may have additional features. For example, the computing environment 1600 includes storage 1640, one or more input devices 1650, one or more output devices 1660, and one or more communication connections 1670. An interconnection mechanism (not shown) such as a bus, a controller, or a network, interconnects the components of the computing environment 1600. Typically, operating system software (not shown)

provides an operating environment for other software executing in the computing environment 1600, and coordinates activities of the components of the computing environment 1600.

The storage 1640 may be removable or non-removable, and includes magnetic disks, magnetic tapes or cassettes, CD-ROMs, CD-RWs, DVDs, or any other medium which can be used to store information and that can be accessed within the computing environment 1600. The storage 1640 stores instructions for the software 1680 and vulnerability rules, which can be used to implement technologies described herein.

The input device(s) 1650 may be a touch input device, such as a keyboard, keypad, mouse, touch screen display, pen, or trackball, a voice input device, a scanning device, or another device, that provides input to the computing environment 1600. For audio, the input device(s) 1650 may be a sound card or similar device that accepts audio input in analog or digital form, or a CD-ROM reader that provides audio samples to the computing environment 1600. The output device(s) 1660 may be a display, printer, speaker, CD-writer, or another device that provides output from the computing environment 1600.

The communication connection(s) 1670 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 1690. For example, agents can be executing vulnerability scanning functions in the computing environment 1630 while dynamic vulnerability correlation actions, such as vulnerability filtering, patch correlation, and vulnerability paring can be performed on servers located in the computing cloud 1690.

Computer-readable media are any available media that can be accessed within a computing environment 1600. By way of example, and not limitation, with the computing environment 1600, computer-readable media include memory 1620 and/or storage 1640. As should be readily understood, the term computer-readable storage media includes the media for data storage such as memory 1620 and storage 1640, and not transmission media such as modulated data signals.

In view of the many possible embodiments to which the principles of the disclosed invention may be applied, it should be recognized that the illustrated embodiments are only preferred examples of the invention and should not be taken as limiting the scope of the invention.

We claim:

1. A method of vulnerability filtering using one or more ontologies of rules, each of the ontologies comprising at least one rule hierarchy comprising one or more vulnerability or weakness scanning rules, the at least one rule hierarchy including priorities that are assigned to at least some of the vulnerability or weakness scanning rules, the method comprising:
   by a computer, attempting to execute a first one of the vulnerability or weakness scanning rules against a target remote computing device in an order based at least in part on the assigned priorities, producing at least one scan result;
   based on the at least one scan result, determining that an attempt to execute the first one of the vulnerability or weakness scanning rules against the target remote computing device was unsuccessful; and
   based on the determining, not executing a scanning rule in the rule hierarchy having a lower assigned priority than the first scanning rule against the target remote computing device.

2. The method of claim 1, further comprising:
   after the not executing the scanning rule, attempting to execute a second one of the vulnerability or weakness scanning rules in a different rule hierarchy than the first scanning rule against the target remote computing device.

3. The method of claim 1, wherein the at least one rule hierarchy is marked as Restrictive, and wherein the method further comprises:
   if a higher priority scanning rule in the at least one rule hierarchy executes successfully against the target remote computing device, then not executing any subsequent scanning rules in the at least one rule hierarchy against the target remote computing device.

4. The method of claim 1, wherein the at least one rule hierarchy is marked as Inclusive, and wherein the method further comprises:
   if a higher priority scanning rule in the at least one rule hierarchy does not execute successfully against the target remote computing device, then not executing any subsequent scanning rules in the at least one rule hierarchy against the target remote computing device.

5. The method of claim 1, wherein the ontologies comprise forests of rules including a Common Vulnerabilities and Exposures (CVE) forest, a Common Weakness Enumeration (CWE) forest, and a Generic forest, each of the forests including at least one rule hierarchy comprising a tree of scanning rules enumerated as a set of branches.

6. The method of claim 1, wherein the order of executing the vulnerability or weakness scanning rules is based at least in part on confidence levels designating the respective reliability of each of the vulnerability or weakness scanning rules.

7. The method of claim 1, wherein the order of executing the vulnerability or weakness scanning rules is based at least in part on confidence levels that cause credentialed scans to be executed before remote scans.

8. The method of claim 1, wherein a host agent executes the scanning rule locally on the target remote computing device.

9. The method of claim 1, wherein the target remote computing device is remotely scanned by a Device Profiler to execute the scanning rules.

10. The method of claim 1, wherein the scanning rules comprise vulnerability scanning rules and weakness scanning rules.

11. An apparatus for analyzing vulnerabilities in a networked environment, the system comprising:
    one or more processors;
    memory;
    a network interface coupled to the one or more processors and configured to scan one or more computers accessible using the network interface; and
    one or more non-transitory computer-readable storage media storing computer-readable instructions that, when executed by the one or more processors, cause the one or more processors to perform a method of scanning the one or more remote computers according to a scanning rule hierarchy comprising a plurality of scanning rules, the instructions comprising:

instructions to attempt to execute two or more branches of the vulnerability scanning rule hierarchy against the one or more remote computers, each of the branches comprising a portion of the vulnerability scanning rules ordered based at least in part on assigned priorities, producing at least one vulnerability scanning rule execution result, instructions to, based on the at least one vulnerability scanning rule execution result, determine that an attempt to execute at least one vulnerability scanning rule associated with the at least one vulnerability scanning rule execution result against the one or more remote computers was unsuccessful, and instructions to, based on the determination, not execute a respective portion of vulnerability scanning rules in one or more branches of the vulnerability scanning rule hierarchy, having a lower assigned priority than the at least one vulnerability scanning rule associated with the at least one vulnerability scanning rule execution result, against the one or more remote computers.

12. The apparatus of claim 11, wherein the computer-readable instructions further comprise:

instructions to, after executing the instructions to not execute the vulnerability scanning rules, attempt to execute a second one of the vulnerability scanning rules in a different branch of the vulnerability scanning rule hierarchy than the two or more branches against the one or more remote computers.

13. The apparatus of claim 11, wherein the vulnerability scanning rule hierarchy is marked as Restrictive, and wherein the computer-readable instructions further comprise:

instructions to, if an attempt to execute a higher priority vulnerability scanning rule in the vulnerability scanning rule hierarchy against the one or more remote computers is successful, then not attempt to execute any subsequent vulnerability scanning rules in the scanning rule hierarchy against the one or more remote computers.

14. The apparatus of claim 11, wherein the vulnerability scanning rule hierarchy is marked as Inclusive, and wherein the computer-readable instructions further comprise:

if an attempt to execute a higher priority vulnerability scanning rule in the scanning rule hierarchy against the one or more remote computers is not successful, then not attempt to execute any subsequent vulnerability scanning rules in the vulnerability scanning rule hierarchy against the one or more remote computers.

15. The apparatus of claim 11, wherein the order of executing the vulnerability scanning rules is based at least in part on confidence levels designating the respective reliability of each of the vulnerability scanning rules.

16. The apparatus of claim 11, wherein the order of executing the vulnerability scanning rules is based at least in part on confidence levels that cause credentialed scans to be executed before remote scans.

17. One or more computer-readable storage media storing computer-readable instructions that, when executed by a computer, cause the computer to perform a method of scanning one or more target remote computers according to a rule hierarchy comprising a plurality of vulnerability or weakness scanning rules, the instructions comprising:

instructions to attempt to execute a first one of the vulnerability or weakness scanning rules to scan the one or more target remote computers using the network interface in an order based at least in part on priorities assigned according to the rule hierarchy comprising the plurality of the vulnerability or weakness scanning rules, producing at least one scan result, instructions to, based on the at least one scan result, determine that the attempt to execute the first one of the vulnerability or weakness scanning rules was unsuccessful, and instructions to, based on the determination, not execute a vulnerability or weakness scanning rule in the rule hierarchy having a different assigned priority than the first vulnerability or weakness scanning rule against the one or more target remote computers.

18. The computer-readable storage media of claim 17, wherein the instructions further comprise, after the not executing the vulnerability or weakness scanning rule, attempting to execute a second one of the vulnerability or weakness scanning rules in a different rule hierarchy than the first vulnerability or weakness scanning rule against the one or more target remote computers.

19. The computer-readable storage media of claim 17, wherein the rule hierarchy is marked as Restrictive, and wherein the instructions further comprise:

if a higher priority vulnerability or weakness scanning rule in the at least one rule hierarchy executes successfully against the one or more target remote computers, then not executing any subsequent vulnerability or weakness scanning rules in the rule hierarchy against the one or more target remote computers.

20. The computer-readable storage media of claim 17, wherein the rule hierarchy is marked as Inclusive, and wherein the instructions further comprise:

if a higher priority vulnerability or weakness scanning rule in the at least one rule hierarchy does not execute successfully against the one or more target remote computers, then not executing any subsequent vulnerability or weakness scanning rules in the rule hierarchy against the one or more target remote computers.

21. The computer-readable storage media of claim 17, wherein the ontologies comprise forests of rules including a Common Vulnerabilities and Exposures (CVE) forest, a Common Weakness Enumeration (CWE) forest, and a Generic forest, each of the forests including at least one rule hierarchy comprising a tree of scanning rules enumerated as a set of branches.

22. The computer-readable storage media of claim 17, wherein the order of executing the scanning rules is based at least in part on confidence levels designating the respective reliability of each of the scanning rules.

23. The computer-readable storage media of claim 17, wherein the order of executing the scanning rules is based at least in part on confidence levels that cause credentialed scans to be executed before remote scans.

24. The computer-readable storage media of claim 17, wherein a host agent executes the vulnerability or weakness scanning rules locally on the one or more target remote computers.

25. The computer-readable storage media of claim 17, wherein the one or more target remote computers are remotely scanned by a Device Profiler to execute the scanning rules.

26. The computer-readable storage media of claim 17, wherein the scanning rules comprise vulnerability scanning rules and weakness scanning rules.

* * * * *